US012173662B1

(12) United States Patent
Merchant

(10) Patent No.: US 12,173,662 B1
(45) Date of Patent: Dec. 24, 2024

(54) VALVE COVER ASSEMBLY FOR INTERNAL COMBUSTION ENGINE

(71) Applicant: Caterpillar Inc., Peoria, IL (US)

(72) Inventor: Jack Albert Merchant, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/522,998

(22) Filed: Nov. 29, 2023

(51) Int. Cl.
*F02D 19/06* (2006.01)

(52) U.S. Cl.
CPC ..... *F02D 19/0694* (2013.01); *F02D 19/0647* (2013.01); *F02D 19/0692* (2013.01)

(58) Field of Classification Search
CPC ............. F02D 19/0694; F02D 19/0647; F02D 19/0692
See application file for complete search history.

(56) References Cited

U.S. PATENT DOCUMENTS

| | | | | |
|---|---|---|---|---|
| 4,384,557 | A * | 5/1983 | Johnson ............... | F02M 55/005 123/468 |
| 6,491,014 | B1 | 12/2002 | Eickert | |
| 10,119,508 | B2 | 11/2018 | Millet | |
| 10,415,443 | B2 | 9/2019 | Nagai et al. | |
| 2017/0122201 | A1 | 5/2017 | Porojan et al. | |

FOREIGN PATENT DOCUMENTS

| | | |
|---|---|---|
| CN | 202690247 | 1/2013 |
| CN | 104879236 | 9/2015 |
| CN | 204677313 | 9/2015 |
| CN | 205779295 | 12/2016 |

* cited by examiner

*Primary Examiner* — Jacob M Amick
(74) *Attorney, Agent, or Firm* — Schwegman Lundberg & Woessner, P.A.

(57) ABSTRACT

The present application includes apparatuses and service methods including a valve cover assembly for an internal combustion engine. The valve cover assembly optionally including: a valve cover; a base extension coupled to the valve cover and having a recess that receives at least a portion of a rocker arm therein; and a grommet coupled to at least the base extension, the grommet having one or more openings for passage of one or more fuel tubes into the recess to deliver one or more fuels to a fuel injector. The at least one of the valve cover and the base extension is removable from the internal combustion engine without disturbing the one or more fuel tubes to provide access to the rocker arm for performing a valve lash adjustment thereon.

20 Claims, 4 Drawing Sheets

VALVE COVER ASSEMBLY FOR INTERNAL COMBUSTION ENGINE

TECHNICAL FIELD

The present disclosure relates to an internal combustion engine. More particularly, the present disclosure relates to a valve cover assembly of the internal combustion engine.

BACKGROUND

Machinery, for example, agricultural, industrial, construction or other heavy machinery can be propelled by an internal combustion engine(s). Internal combustion engines can be used for other purposes such as for power generation. Internal combustion engines combust a mixture of air and fuel(s) in cylinders and thereby produce drive torque and power. Internal combustion engines may be designed to run on gasoline fuel, in which a spark plug initiates combustion, on diesel fuel, that is compression ignited, or on other fuels, such as gaseous fuels. Engines can also run by combusting two different fuel types in a single combustion cycle. The use of two fuels in a single combustion cycle can provide benefits by substituting a portion of fuel that may produce greater emissions, or that may have higher cost, with another fuel that may produce fewer emissions and/or have a reduced cost.

Internal combustion engines utilize valve trains to control intake and exhaust of gases into and out of the combustion chambers. The valve train includes valves, rocker arms, pushrods, and camshafts that open and close the valves in a timed sequence. The valves are actuated by the camshafts through the rocker arms and pushrods.

Periodic adjustment of valve lash clearance is required as part of routine maintenance of internal combustion engines. Valve lash refers to the small clearance between a tip of the rocker arm and a valve stem or valve bridge. This clearance is typically adjusted by turning an adjustment screw on the rocker arm. Access to the valve train components is needed to perform this valve lash adjustment.

Chinese Utility Models CN205779295U and CN204677313U and United States Patent No. 7 U.S. Pat. No. 10,119,508B2 disclose valve cover assemblies. However, these utility models and patent do not recognize a valve cover assembly with the construction and other benefits in the manner disclosed herein.

SUMMARY

In an example according to this disclosure, a valve cover assembly for an internal combustion engine, optionally including: a valve cover; a base extension coupled to the valve cover and having a recess that receives at least a portion of a rocker arm therein; and a grommet coupled to at least the base extension, the grommet having one or more openings for passage of one or more fuel tubes into the recess to deliver one or more fuels to a fuel injector; wherein at least one of the valve cover and the base extension is removable from the internal combustion engine without disturbing the one or more fuel tubes to provide access to the rocker arm for performing a valve lash adjustment thereon.

In another example according to this disclosure, a method of servicing a rocker arm of an internal combustion engine, optionally including: providing a valve cover assembly including a valve cover, a base extension, and a grommet capturing one or more fuel tubes connected to a fuel injector of the internal combustion engine; removing at least one of the valve cover and base extension from the internal combustion engine without disturbing the one or more fuel tubes; performing a valve lash adjustment on the rocker arm exposed by removing the at least one of the valve cover and base extension; and re-installing the at least one of the valve cover and base extension on the internal combustion engine.

In yet another example according to this disclosure, an internal combustion engine, optionally including: an engine block including a rocker box; a fuel injector configured to extend into the rocker box; one or more fuel tubes connected to the fuel injector for delivering one or more fuels; and a valve cover assembly configured to mount on the engine block, including: a valve cover; a base extension configured to couple with the valve cover; and a grommet configured to couple to at least the base extension, the grommet having one or more openings for passage of the one or more fuel tubes to deliver the one or more fuels to the fuel injector.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples of the present disclosure are now described with reference to the accompanying drawings. The following description is merely exemplary in nature and is not intended to limit the present disclosure, application, or use. Examples described set forth specific components, devices, and methods, to provide an understanding of embodiments of the present disclosure. It will be apparent to those skilled in the art that specific details need not be employed and that examples may be embodied in many different forms. Thus, the examples provided should not be construed to limit the scope of the claims.

As used herein, the terms “comprises,” “comprising,” “having,” including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, “about,” “substantially,” “generally,” and “approximately” are used to indicate a possible variation of +10% in a stated value. The term “tube” is not limited to metallic pipe but includes hose, line or other structure and need not be constructed of metal. As used herein, a "gaseous fuel" may include gaseous fuel such as, natural gas, methane, butane, propane, bio-gas, landfill gas, hydrogen, and blends thereof, for example. Natural gas is an exemplary gaseous fuel having various levels of purity. As used herein "natural gas" refers to both pure and relatively impure forms having various amounts of methane and other constituents. The gaseous fuel may be provided to an intake component of the internal combustion engine in a compressed form. The gaseous fuel may be stored in a liquid form in a storage tank, and converted to gas (e.g. by heating) prior to introduction to the intake component. As used herein, a "liquid fuel" may include gasoline, diesel, methanol, ethanol, or any other liquid fuel.

Figure 1:
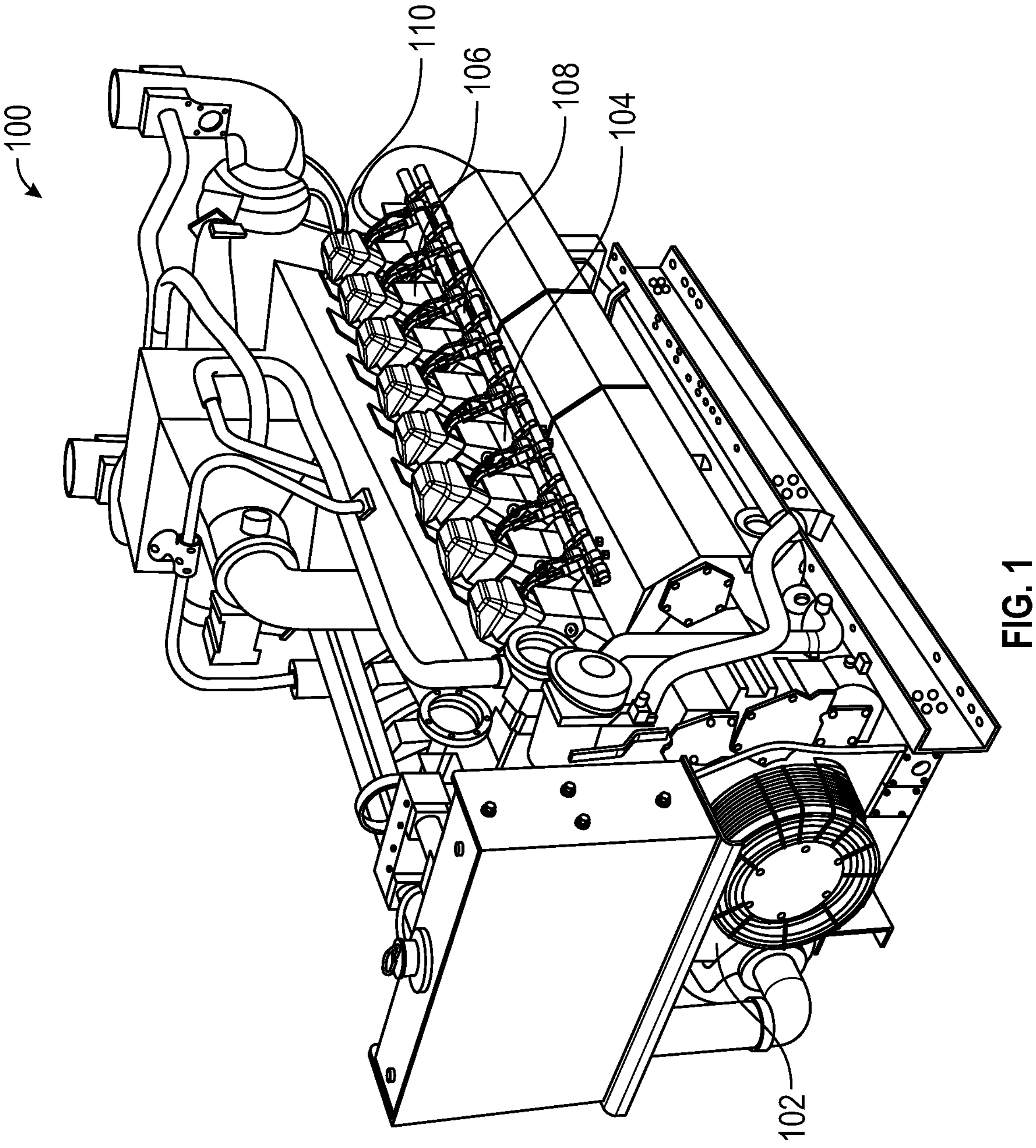
FIG. 1 is a perspective view of an exemplary internal combustion engine in accordance with an example of the present application.

FIG. 1 depicts parts of an internal combustion engine 100 (sometimes referred to as simply as "engine" herein) in accordance with this disclosure. The engine 100 can be used for power generation such as for the propulsion of vehicles or other machinery or for stationary power generation. The engine 100 can include various power generation platforms, and can use various a single fuel of dual fuels including, for example, liquid fuel and/or gaseous fuel. Stationary engines may be used to drive immobile equipment, such as pumps, generators, mills, or factory equipment. It is understood that the present disclosure can apply to any number of piston-cylinder arrangements and a variety of engine configurations including, but not limited to, V-engines, inline engines, and horizontally opposed engines, as well as overhead cam and cam-in-block configurations. Vehicles and working machinery that can be driven include those related to various industries, including, as examples, construction, agriculture, forestry, transportation, material handling, waste management, etc.

The engine 100 can include an engine block 102, a cylinder head 104, a rocker box 106 and a fuel rail system 108. The cylinder head 104 can be mounted to the engine block 102. The rocker box 106 can be mounted to the cylinder head 104. The engine block 102 includes one or more cylinders (not shown) provided therein. The cylinders may be arranged in any configuration such as inline, radial, "V", or the like as discussed above. The cylinders can define combustion chambers in which pistons reciprocate. Energy generated from combustion of the fuel inside the cylinders can be converted to rotational energy of the crankshaft by the pistons.

The cylinder head 104 and/or the rocker box 106 can form a housing for components such as a fuel injector (not shown). Each fuel injector can be in fluid communication with a respective combustion chamber and can be mounted in the cylinder head 104 and/or rocker box 106. The cylinder head 104 may house one or more components and/or systems (not shown) of the engine 100 such as a valve train, an intake manifold, an exhaust manifold, sensors, etc. Additionally, the engine 100 may include various other components and/or systems (not shown) such as a crankcase, a fuel system, an air system, a cooling system, a turbocharger, an exhaust gas recirculation system, an exhaust gas aftertreatment system, etc.

The engine 100 also includes the fuel rail system 108. This system can be double walled for enclosure in some cases. The fuel rail system 108 can be fluidly connected to one or more fuel pumps (not shown). The fuel rail system 108 can be configured to receive pressurized gaseous or liquid fuel therein from the one or more fuel pumps. The fuel rail system 108 can be fluidly connected to fuel injectors (not shown) associated with the cylinders of the engine 100. Accordingly, the fuel rail system 108 is configured to supply the pressurized gaseous fuel and/or liquid fuel to each of the fuel injectors.

During operation of the engine 100, air enters the combustion chambers via intake valves. Air is able to enter the combustion chambers when the air intake valves are open, generally, during an intake stroke and/or at the end of an exhaust stroke and/or at the beginning of a compression stroke. When air is present in the combustion chambers, the fuel injectors can inject high pressure fuel as fuel jets. The fuel jets will generally disperse within the combustion chambers to create a fuel/air mixture within the combustion chambers. Ignition produces combustion, which, in turn, provides work on the pistons to produce motion upon the crankshaft to drive an output.

Figure 2:
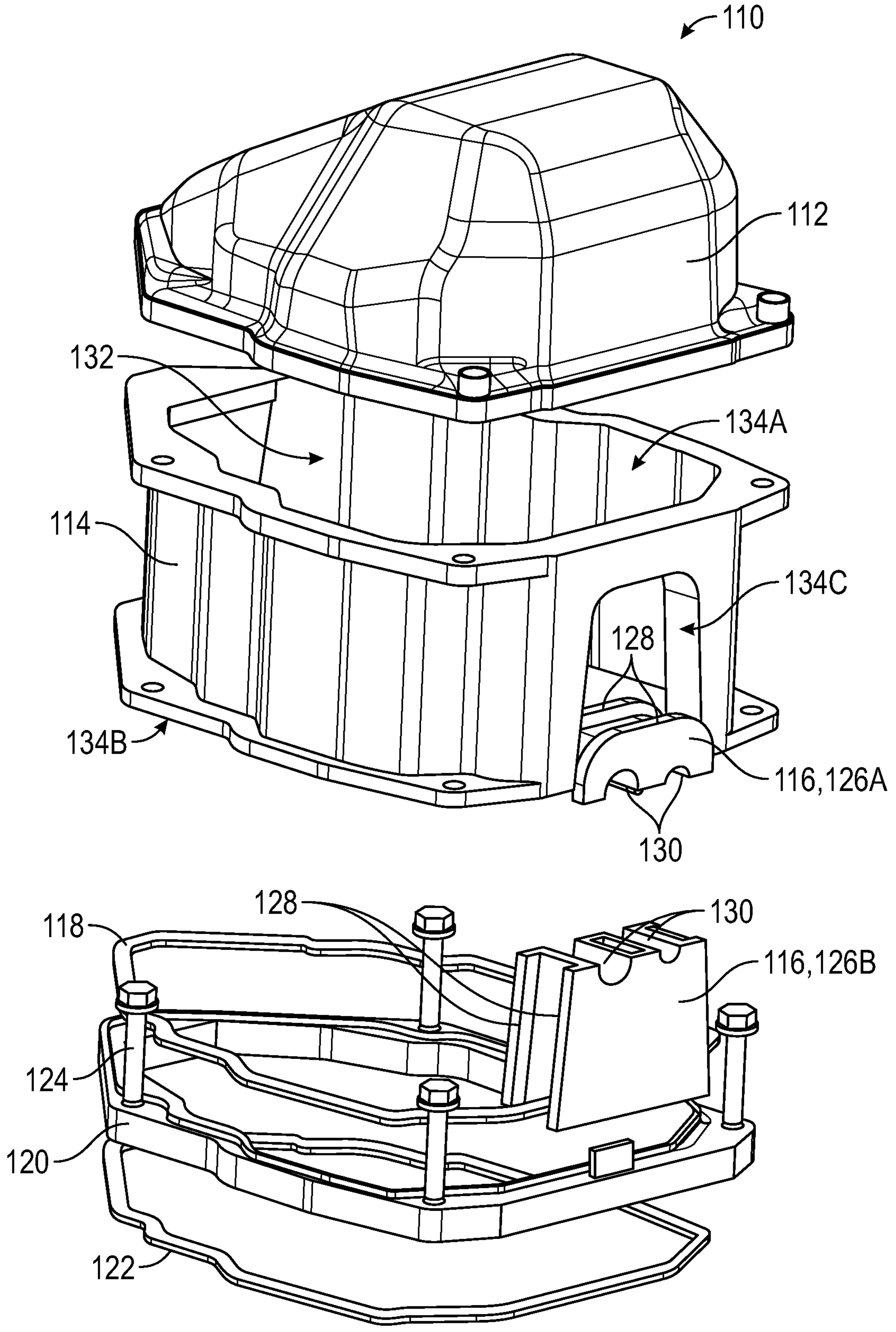
FIG. 2 is an exploded view of a valve cover assembly of the internal combustion engine in accordance with an example of the present application.

FIG. 2 shows an exploded view of a valve cover assembly 110. The valve cover assembly 110 can be configured to mount on the cylinder head 104 or the rocker box 106 of FIG. 1, for example. The valve cover assembly 110 can include a valve cover 112, a base extension 114, a grommet 116, a first seal 118, an intermediate component 120, a second seal 122 and fasteners 124. The grommet 116 can include a first section 126A, a second section 126B, sealing features 128 and openings 130.

The valve cover 112 can be an existing cover utilized as a cover for Closed Crankcase Ventilation (CCV) or breather applications of the applicant. Thus, the design of the valve cover 112 need not be modified from existing design. The valve cover 112, the base extension 114 and the intermediate component 120 can be formed of suitable material(s) such as metal, metal alloy, temperature stable polymer (e.g., polyimide) for example. The valve cover 112 can be configured to seat on and can be coupled with the base extension 114. Fasteners (not illustrated) can be utilized to attach the cover 112 to the base extension 114. Additionally, a sealing interface can be formed between the valve cover 112 and the base extension 114 as known in the art.

The base extension 114 can be configured to couple to the valve cover 112 and can have (e.g., form) a recess 132 therein. The base extension 114 can have opposing openings 134A and 134B to the recess 132. A third opening 134C to the recess 132 can also be formed by the base extension 114 and can be configured to receive the grommet 116. The recess 132 can be configured to receive at least a portion of a rocker arm therein as further illustrated in FIG. 3 and a fuel injector as further illustrated in FIG. 4. The base extension 114 is configured to mount on one of the rocker box 106 (FIGS. 1 and 3), the cylinder head 104 (FIGS. 1 and 3), or the intermediate component 120.

The grommet 116 can be formed of an overmold, a stiff or substantially stiff material or other suitable material. Such stiff material can be an elastomeric material such as but not limited silicone rubber with a high durometer rating, fluoroelastomers (e.g., Viton), butyl rubber, epichlorohydrin (ECH) rubber, etc. The grommet 116 can be configured (e.g., with suitable material, shape, etc.) to dampen and/or control engine vibration to fuel tubes as further illustrated subsequently. The grommet 116 can be segmented/split into at least two separate components termed sections (e.g., the first section 126A and the second section 126B) such as along a split-line or split-lines. The number of sections, the orientation of such sections, the positioning of the split-line(s) are purely exemplary and can be modified according to other examples.

The grommet 116 can be provided with the sealing features 128, which interface with and are coupled to corresponding sealing features of the base extension 114 when the valve cover assembly 110 is assembled fully and mounted on the internal combustion engine. The sealing features 128 can be, e.g., flanges, grooves, serpentine arrangements, dedicated rubber-rubber seals or other known sealing components or arrangements as known in the art. The sealing features 128 and the corresponding sealing features of the base extension 114 can be configured to form a sealing interface(s) to keep a lubricating oil (e.g., rocker system lubrication splash) within the recess 132, for example.

Figure 3:
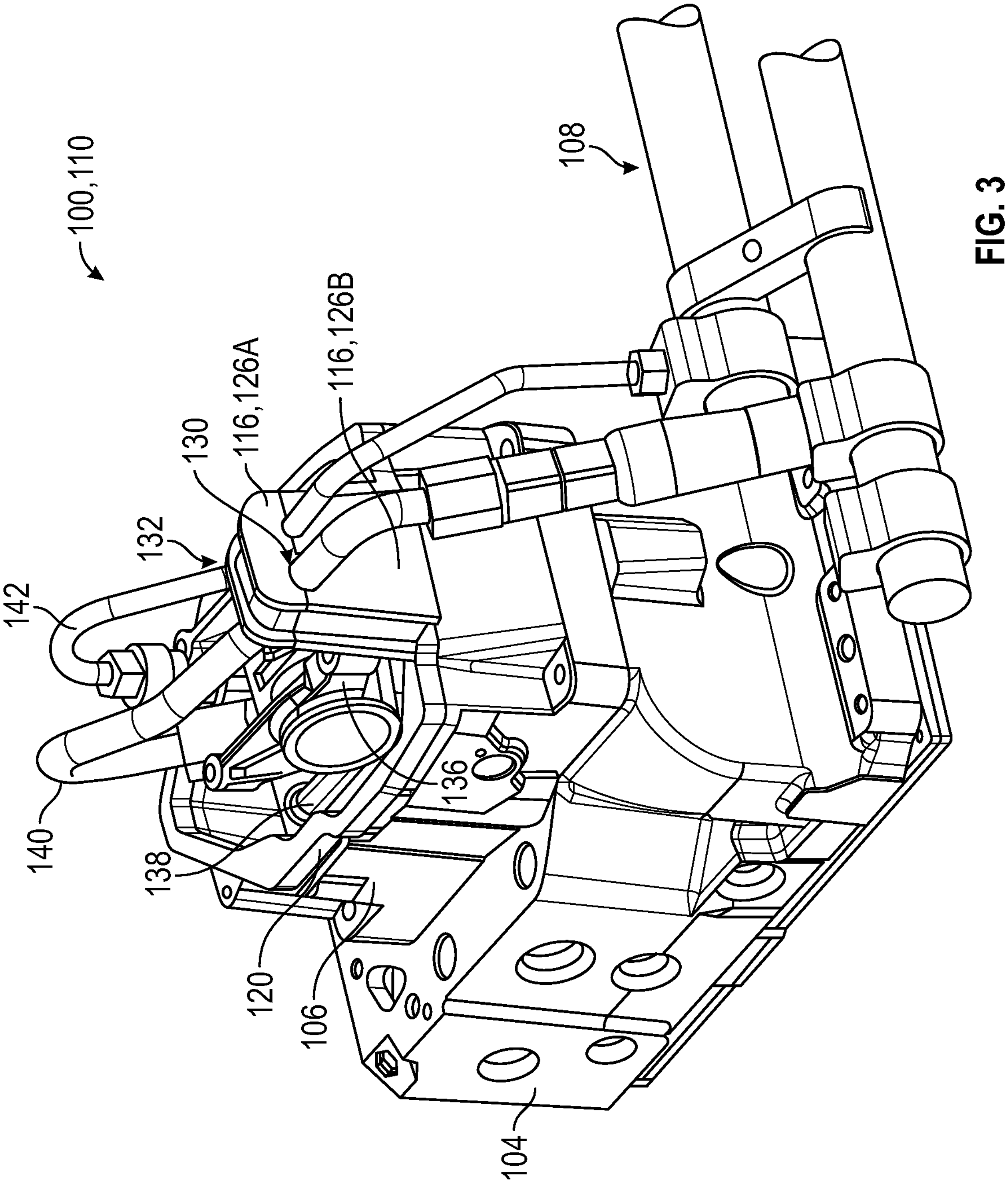
FIG. 3 shows a perspective view of a portion of the internal combustion engine including part of a rocker box and part of a cylinder head with a base extension and valve cover of the valve cover assembly removed to show a rocker arm in accordance with an example of the present application.
Figure 4:
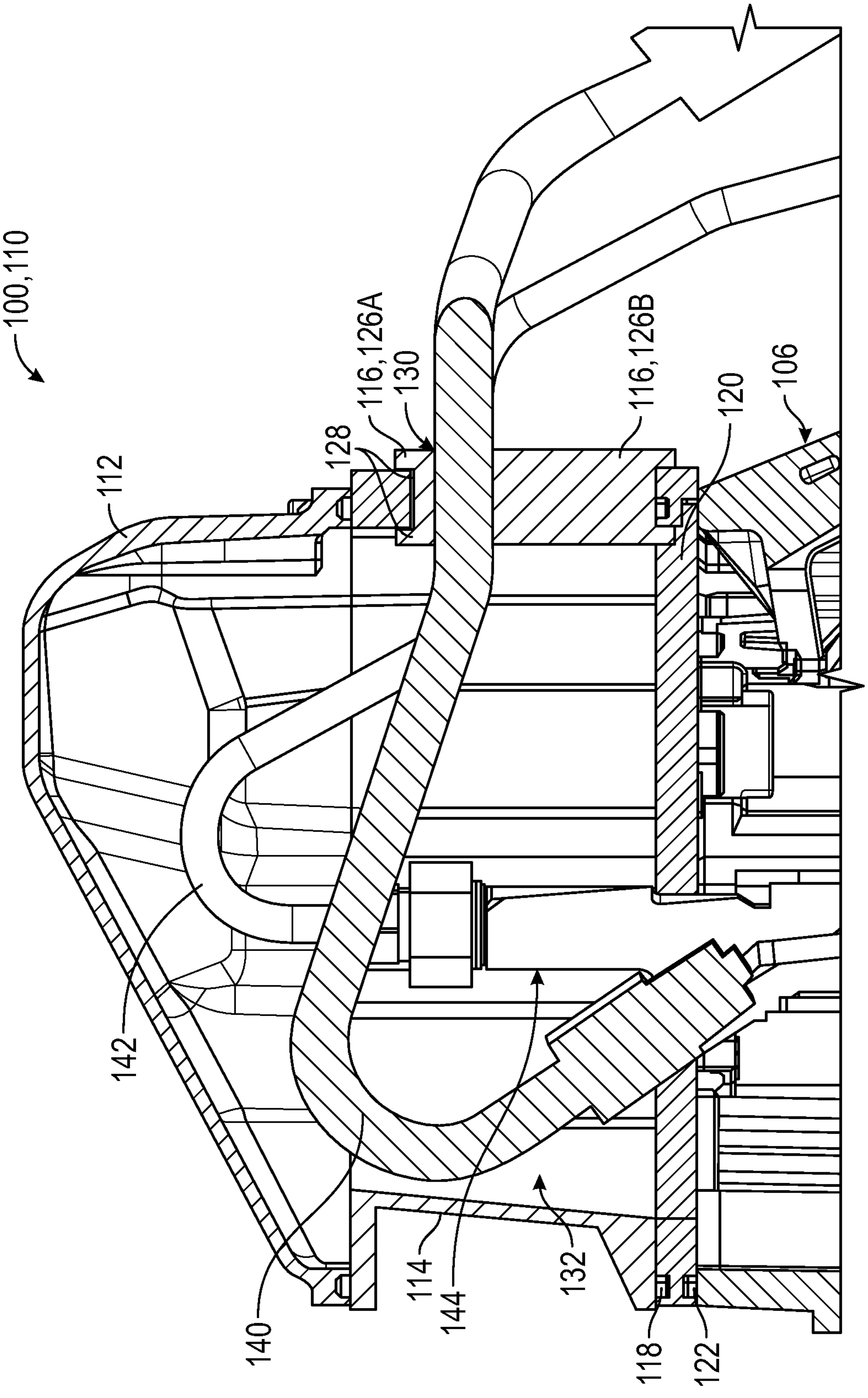
FIG. 4 is a cross-sectional view of the valve cover assembly and part of the rocker box in accordance with an example of the present application.

The first section 126A and the second section 126B can be separable from one another to initially receive fuel tubes (see FIGS. 3 and 4). In particular, the first section 126A and the second section 126B can include the openings 130 therethrough. The openings 130 of the first section 126A can be on a distal edge of the first section 126A that interfaces with a proximal edge of the second section 126B also having the openings 130. When the first section 126A is coupled to the second section 126B, the openings 130 of the first section 126A and the second section 126B can substantially align so as to form full passages (e.g., having a desired cross-sectional area and shape) for receiving and allowing for passage of the fuel tubes.

The first seal 118 can be shaped and positioned so as to be captured between the base extension 114 and the intermediate component 120. The intermediate component 120 can be configured to mount on the internal combustion engine such as the rocker box 106 (FIGS. 1 and 3) or the cylinder head 104 (FIGS. 1 and 3). The fasteners 124 can attach the intermediate component 120 to the rocker box 106 (FIGS. 1 and 3) or the cylinder head 104 (FIGS. 1 and 3). The intermediate component 120, although illustrated in the examples of FIGS. 2-4, is an optional component and may not be utilized according to some examples. Where the intermediate component 120 is not utilized, the base extension 114 can mount directly on the rocker box 106 (FIGS. 1 and 3) or the cylinder head 104 (FIGS. 1 and 3). The second seal 122 (if utilized) can be shaped and positioned so as to be captured between the intermediate component 120 and the rocker box 106 (FIGS. 1 and 3) or the cylinder head 104 (FIGS. 1 and 3). Together the intermediate component 120, the first seal 118 and the second seal 122 can help to keep lubricating oil of the rocker system within the recess 132, for example.

FIG. 3 shows the valve cover assembly 110 mounted to the internal combustion engine 100 with the valve cover 112 (FIGS. 2 and 4) and the base extension 114 (FIGS. 2 and 4) removed to show a rocker arm 136 and a valve bridge 138 that are at least partially positioned within the recess 132 when the base extension 114 (FIGS. 2 and 4) is mounted to the internal combustion engine 100. The valve cover 112 and the base extension 114 are configured to be selectively attachable to and removable from the internal combustion engine 100. In particular, the base extension 114 can be selectively attachable to and removable from the rocker box 106 (e.g., directly or via the intermediate component 120) to provide access to the rocker arm 136 and/or other components such as the valve bridge 138 and/or fuel injector for maintenance, for example. Such maintenance can include valve lash adjustment. At least one of (or both of) the valve cover 112 (FIGS. 2 and 4) and the base extension 114 (FIGS. 2 and 4) is removable from the internal combustion engine 100 without disturbing the one or more fuel tubes (e.g., a first fuel tube 140 and a second fuel tube 142) to provide access to the rocker arm 136 for performing the valve lash adjustment thereon. Put another way, the first fuel tube 140 and the second fuel tube 142 can remain attached to the grommet 116 and connected to a fuel injector (not shown but shown in FIG. 4) while the valve lash adjustment and/or other maintenance is performed). Thus, valve lash adjustment and other maintenance can be performed without requiring disconnection of the first fuel tube 140 and the second fuel tube 142 from the fuel injector.

FIG. 3 shows portions of the cylinder head 104 and the rocker box 106 along with the grommet 116 and the intermediate component 120. The intermediate component 120 is mounted to the rocker box 106. The rocker arm 136 at least partially extends from the rocker box 106 and the valve bridge 138.

FIG. 3 additionally shows portions the fuel rail system 108 configured for dual fuels including the first fuel tube 140 and the second fuel tube 142. As the internal combustion engine 100 is configured to operate with dual fuels, for example, two liquid fuels, liquid fuel and/or gaseous fuel, passage through the cylinder head 104 and the rocker box 106 can be difficult due to limited space within one or both components for passage of both fuels. As such, the present internal combustion engine 100 design passes the first fuel tube 140 and a second fuel tube 142 through the valve cover assembly 110, and in particular, through the grommet 116 and down into the recess 132 to the fuel injector (not shown in FIG. 3 but shown in FIG. 4). According to one example, the first fuel tube 140 can pass one of methanol, ethanol or natural gas to the fuel injector and the second fuel tube 142 can pass diesel to the fuel injector.

As shown in FIG. 3, the grommet 116 is split into the two separate sections, the first section 126A and the second section 126B. Together the first section 126A and the second section 126B receive the first fuel tube 140 and the second fuel tube 142 via the openings 130. The first section 126A can be compressed against the second section 126B by the base extension 114 (FIGS. 2 and 4) when mounted and fastened to the internal combustion engine 100. This can provide for sealing at the edges of openings 130 around the first fuel tube 140 and the second fuel tube 142. In some embodiments, both the first section 126A and the second section 126B can be compressed by the base extension 114 (FIGS. 2 and 4) when mounted and fastened to the internal combustion engine 100. This can provide for sealing around the first fuel tube 140 and the second fuel tube 142. As discussed previously, the grommet 116 can be formed of suitable material(s) such as the elastomeric material configured to compress and provide vibration damping to the first fuel tube 140 and the second fuel tube 142 during operation of the internal combustion engine 100.

FIG. 3 illustrates a method of servicing the rocker arm 136 and/or other components of the internal combustion engine 100. The method captures the first fuel tube 140 and the second fuel tube 142 with the grommet 116 of the valve cover assembly 110. The first fuel tube 140 and the second fuel tube 142 can be connected to and remain connected to the fuel injector (see FIG. 4) of the internal combustion engine 100. The method can include removing at least one of the valve cover 112 (FIGS. 2 and 4) and the base extension 114 (FIGS. 2 and 4) from the internal combustion engine 100 without disturbing the first fuel tube 140 and the second fuel tube 142. In FIG. 3, both the valve cover 112 (FIGS. 2 and 4) and the base extension 114 (FIGS. 2 and 4) are removed. The method can include performing the valve lash adjustment or other maintenance on the rocker arm 136 exposed by removing the valve cover 112 (FIGS. 2 and 4) and/or the base extension 114 (FIGS. 2 and 4). The method can include re-installing the valve cover 112 (FIGS. 2 and 4) and/or the base extension 114 (FIGS. 2 and 4) on the internal combustion engine 100. As illustrated in FIG. 3, the method can include segmenting the grommet 116 into the first section 126A and the second section 126B to allow for initial passage of the first fuel tube 140 and the second fuel tube 142 through the grommet 116 without a connecting component (e.g., bulkhead fittings and flanged connector). The method can include that the first fuel tube 140 and the second fuel tube 142 remains connected to the fuel injector (see FIG. 4) during the performing the valve lash adjustment and/or other maintenance.

FIG. 4 shows a cross-sectional view of the valve cover assembly 110 and an upper portion of the rocker box 106. FIG. 4 additionally shows a fuel injector 144 coupled to the first fuel tube 140 and the second fuel tube 142. The fuel injector 144 is partially positioned within the rocker box 106 but extends into the recess 132 defined by the base extension 114. The valve cover assembly 110 is mounted on the rocker box 106. The valve cover assembly 110 includes the valve cover 112, the base extension 114, the grommet 116, the first seal 118, the intermediate component 120 and the second seal 122 as previously discussed in regard to FIG. 2. The grommet 116 can include the first section 126A, the second section 126B, the sealing features 128 and the openings 130. The rocker arm 136 (FIG. 3) is not shown in the cross-section of FIG. 4.

FIG. 4 illustrates the first fuel tube 140 and the second fuel tube 142 passing through the grommet 116 without connecting components and passing to connection with the fuel injector 144. The fuel injector 144 can be accessible (along with the rocker arm (not shown) and other components) with removal of the valve cover 112 and the base extension 114 from the rocker box 106 as previously illustrated in FIG. 3. As previously discussed, the first fuel tube 140 and the second fuel tube 142 need not be disconnected from the fuel injector 144 or otherwise disturbed by the removal of the valve cover 112 and the base extension 114 or during the maintenance.

Industrial Applicability

In operation, the engine 100 can be configured to combust fuel(s) to generate power. Routine maintenance including valve lash adjustment of the engine 100 is required to adjust engine intake and/or exhaust. With a typical engine design, a valve cover encloses the valve train components and is removed to provide access for the valve lash adjustments and other maintenance. However, modern engines have compact designs that do not allow for easy removal of the valve cover to provide access for maintenance. Some modern engines particularly those that utilize dual fuels can utilize fuel injectors mounted under the valve cover which require fuel tubes running through the valve cover. Removing the valve cover requires disconnecting the fuel tubes leading to increased maintenance time. Additionally, disconnecting includes opening the fuel system. This risks contamination and requires subsequent fuel system purging. Disconnection and fuel system purging can be costly and time consuming. Typically, engines can provide access through the valve cover via bulkhead fittings and flanged connector. However, these components are too large to employ in the compressed space of many modern engines and/or can result in having to open the fuel system.

The present application discloses a valve cover assembly 110. The valve cover assembly 110 can utilize a typical valve cover 112 such that the valve cover need not be redesigned. Additionally, the valve cover assembly 110 includes the base extension 114 and the grommet 116. The grommet can be configured to receive and allow one or more fuel tubes to pass therethrough. The base extension can be removable from the internal combustion engine and other components (e.g., the valve cover, the grommet, the rocker box and/or an intermediate component). The base extension provides mechanical features such as groove and flanges to hold and compress the grommet around the one or more fuel tubes. The grommet can be split into two or more sections. For example, the grommet can have the first (upper) section 126A and the second (lower) section 126B. The first section and/or the second section can be compressed around the one or more fuel tubes (first fuel tube 140 and the second fuel tube 142) such that lube oil and fumes are sealed within the valve cover assembly. The base extension, valve cover and/or first grommet section can be removable from the internal combustion engine without disturbing the one or more fuel tubes to provide space for regular maintenance including the valve lash adjustment. Put another way, the valve cover assembly is configured to allow the valve cover, the base extension, and/or one or more sections of the grommet to be removed without disconnecting the one or more fuel tubes from the fuel injector 144. This provides access to valve components such as the rocker arm 136 and the valve bridge 138 for valve lash adjustment and other maintenance to be performed without disturbing (disconnecting the one or more fuel tubes from the fuel injector) the fuel system. Thus, the present design of the valve cover assembly can save substantial amount of time and cost associated with engine maintenance.

The above detailed description is intended to be illustrative, and not restrictive. The scope of the disclosure should, therefore, be determined with references to the appended claims, along with the full scope of equivalents to which such claims are entitled.

What is claimed is:

1. A valve cover assembly for an internal combustion engine, comprising:
- a valve cover;
- a base extension coupled to the valve cover and having a recess that receives at least a portion of a rocker arm therein; and
- a grommet coupled to at least the base extension, the grommet having one or more openings for passage of one or more fuel tubes into the recess to deliver one or more fuels to a fuel injector;
- wherein the grommet is split into at least two separate sections that are separable from one another to receive the one or more fuel tubes;
- wherein the grommet includes a first section and a second section that together receive the one or more fuel tubes, wherein the first section is compressed against the second section by one of the base extension or the valve cover; and
- wherein at least one of the valve cover and the base extension is removable from the internal combustion engine without disturbing the one or more fuel tubes to provide access to the rocker arm for performing a valve lash adjustment thereon.

2. The valve cover assembly of claim 1, wherein the base extension is configured to mount on one of a rocker box, a cylinder head or an intermediate component of the internal combustion engine.

3. A valve cover assembly for an internal combustion engine, comprising:
- a valve cover;
- a base extension coupled to the valve cover and having a recess that receives at least a portion of a rocker arm therein; and a grommet coupled to at least the base extension, the grommet having one or more openings for passage of one or more fuel tubes into the recess to deliver one or more fuels to a fuel injector;

wherein at least one of the valve cover and the base extension is removable from the internal combustion engine without disturbing the one or more fuel tubes to provide access to the rocker arm for performing a valve lash adjustment thereon; and wherein the one or more fuel tubes include a first fuel tube for a first fuel and a second fuel tube for a second fuel.

4. The valve cover assembly of claim 3, wherein the first fuel of the first fuel tube is diesel and the second fuel of the second fuel tube is one of: methanol, ethanol or natural gas.

5. The valve cover assembly of claim 3, wherein the grommet is configured to form a seal with at least the base extension to seal lubricating oil within the recess.

6. The valve cover assembly of claim 1, wherein the grommet comprises an elastomeric material configured to provide vibration damping to the one or more fuel tubes during operation of the internal combustion engine.

7. A method of servicing a rocker arm of an internal combustion engine, comprising:

providing a valve cover assembly including a valve cover, a base extension, and a grommet capturing one or more fuel tubes connected to a fuel injector of the internal combustion engine;

removing at least one of the valve cover and base extension from the internal combustion engine without disturbing the one or more fuel tubes;

performing a valve lash adjustment on the rocker arm exposed by removing the at least one of the valve cover and base extension; and re-installing the at least one of the valve cover and base extension on the internal combustion engine.

8. The method of claim 7, further comprising segmenting a first section of the grommet from a second section of the grommet to allow for passage of the one or more fuel tubes through the grommet without connecting components.

9. The method of claim 7, wherein the one or more fuel tubes remains connected to the fuel injector during the performing the valve lash adjustment.

10. The method of claim 7, wherein the one or more fuel tubes include a first fuel tube for a first fuel and a second fuel tube for a second fuel.

11. The valve cover assembly of claim 10, wherein the first fuel of the first fuel tube is diesel and the second fuel of the second fuel tube is one of: methanol, ethanol or natural gas.

12. An internal combustion engine, comprising:

an engine block including a rocker box;

a fuel injector extending into the rocker box;

one or more fuel tubes connected to the fuel injector for delivering one or more fuels; and a valve cover assembly mounted on the engine block, comprising:

a valve cover;

a base extension coupled to the valve cover; and a grommet coupled to at least the base extension, the grommet having one or more openings for passage of the one or more fuel tubes to deliver the one or more fuels to the fuel injector;

wherein the grommet is split into at least two separate sections that are separable from one another to receive the one or more fuel tubes, wherein the grommet includes a first section and a second section, wherein the first section is compressed against the second section by one of the base extension or the valve cover.

13. The internal combustion engine of claim 12, wherein the valve cover and the base extension are removable from the internal combustion engine to provide access to perform a valve lash adjustment on a rocker arm without requiring disconnection of the one or more fuel tubes from the fuel injector.

14. The internal combustion engine of claim 12, wherein the base extension is mounted on one of the rocker box, a cylinder head or an intermediate component of the internal combustion engine.

15. The internal combustion engine of claim 12, wherein the one or more fuel tubes include a first fuel tube for a first fuel and a second fuel tube for a second fuel.

16. The internal combustion engine of claim 15, wherein the first fuel of the first fuel tube is diesel and the second fuel of the second fuel tube is one of: methanol, ethanol or natural gas.

17. The internal combustion engine of claim 12, wherein the grommet comprises an elastomeric material configured to provide vibration damping to the one or more fuel tubes during operation of the internal combustion engine.

18. The valve cover assembly of claim 3, wherein the base extension is configured to mount on one of a rocker box, a cylinder head or an intermediate component of the internal combustion engine.

19. The valve cover assembly of claim 3, wherein the grommet is split into at least two separate sections that are separable from one another to receive the one or more fuel tubes.

20. The valve cover assembly of claim 19, wherein the grommet includes a first section and a second section that together receive the one or more fuel tubes, wherein the first section is compressed against the second section by one of the base extension or the valve cover.

* * * * *